US010556405B2

(12) United States Patent
Kotake et al.

(10) Patent No.: US 10,556,405 B2
(45) Date of Patent: Feb. 11, 2020

(54) PRODUCTION METHOD FOR AEROGEL LAMINATE, AND AEROGEL LAMINATE ROLL

(71) Applicant: Hitachi Chemical Company, LTD., Tokyo (JP)

(72) Inventors: Tomohiko Kotake, Tokyo (JP); Masato Miyatake, Tokyo (JP); Chisato Kikkawa, Tokyo (JP); Hiroyuki Izumi, Tokyo (JP); Hikari Murai, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 131 days.

(21) Appl. No.: 15/546,700

(22) PCT Filed: Jan. 27, 2016

(86) PCT No.: PCT/JP2016/052284
§ 371 (c)(1),
(2) Date: Jul. 27, 2017

(87) PCT Pub. No.: WO2016/121798
PCT Pub. Date: Aug. 4, 2016

(65) Prior Publication Data
US 2018/0009199 A1    Jan. 11, 2018

(30) Foreign Application Priority Data

Jan. 27, 2015 (JP) .................. 2015-013663

(51) Int. Cl.
*B32B 27/06* (2006.01)
*B32B 1/00* (2006.01)
*C08J 9/28* (2006.01)

(52) U.S. Cl.
CPC ............... *B32B 27/06* (2013.01); *B32B 1/00* (2013.01); *C08J 9/28* (2013.01); *B32B 2264/102* (2013.01); *B32B 2309/105* (2013.01); *C08J 2383/04* (2013.01)

(58) Field of Classification Search
CPC ........... B32B 27/06; B32B 27/00; B32B 1/00; B32B 2309/105; B32B 2264/102; C08J 9/28; C08J 2383/04

USPC ......................................................... 428/447
See application file for complete search history.

(56) References Cited

U.S. PATENT DOCUMENTS

| | | | | |
|---|---|---|---|---|
| 5,207,814 A | * | 5/1993 | Cogliati | B01J 13/0091 501/12 |
| 2014/0044929 A1 | | 2/2014 | Evans et al. | |
| 2014/0287641 A1 | * | 9/2014 | Steiner, III | B32B 5/26 442/223 |
| 2019/0263089 A1 | * | 8/2019 | Kotake | B32B 5/18 |

FOREIGN PATENT DOCUMENTS

| | | | |
|---|---|---|---|
| EP | 0382310 A2 * | 8/1990 | .......... B01J 13/0091 |
| JP | H02-248335 A | 10/1990 | |
| JP | S61-91024 A | 7/1994 | |
| JP | H08-300567 A | 11/1996 | |
| JP | 2000-026609 A | 1/2000 | |
| JP | 2001-179866 A | 7/2001 | |
| JP | 2003-288029 A | 10/2003 | |
| JP | 2003288029 A * | 10/2003 | |
| JP | 2006-003562 A | 1/2006 | |
| JP | 2007-042315 A | 2/2007 | |
| JP | 2010-033745 A | 2/2010 | |
| JP | 2011-222385 A | 11/2011 | |
| JP | 4898435 B2 | 3/2012 | |
| JP | 2012-233110 A | 11/2012 | |
| JP | 2013-112625 A | 6/2013 | |
| JP | 5250900 B2 | 7/2013 | |
| WO | 2013/061746 A1 | 5/2013 | |
| WO | 2014/026088 A1 | 2/2014 | |
| WO | 2014/142125 A1 | 2/2017 | |

OTHER PUBLICATIONS

International Search Report for PCT/JP2016/052284 dated Mar. 29, 2016; English translation submitted herewith (7 pages).
International Preliminary Report on Patentability of WO Appln. No. PCT/JP2016/052284 dated Aug. 10, 2017 in English.

* cited by examiner

*Primary Examiner* — Douglas J McGinty
(74) *Attorney, Agent, or Firm* — Fitch, Even, Tabin & Flannery, LLP (57) ABSTRACT

The present invention relates to a production method for an aerogel laminate including a support, and an aerogel layer disposed on the support and having a thickness of 200 μm or less, the method comprising a step of washing a wet gel laminate including the support and a wet gel layer disposed on the support by a roll-to-roll scheme.

5 Claims, 5 Drawing Sheets

PRODUCTION METHOD FOR AEROGEL LAMINATE, AND AEROGEL LAMINATE ROLL

CROSS-REFERENCE TO RELATED APPLICATIONS

This application is a U.S. national phase application filed under 35 U.S.C. § 371 of International Application PCT/JP2016/052284, filed on Jan. 27, 2016, designating the United States, which claims benefit of the filing date of JP 2015-013663, filed Jan. 27, 2015, which is hereby incorporated herein by reference in its entirety.

TECHNICAL FIELD

The present invention relates to a production method for an aerogel laminate, and an aerogel laminate roll.

BACKGROUND ART

Recently, requirements for comfortability of living spaces and energy saving have been increasing; for this reason, the shapes of target objects required for thermal insulation properties tend to become complex, and the spaces for disposing thermal insulation materials tend to be reduced. For this reason, a thermal insulation material having not only enhanced thermal insulation performance but also a lower thickness has been required.

As an attempt for an enhancement in thermal insulation performance of a thermal insulation material using a foamed resin, for example, a plate-shaped foam containing at least one layer of metal thin film on the surface and/or the inside of a polypropylene-based resin foam has been proposed in Patent Literature 1.

Moreover, aerogels are known as a material having low thermal conductivity and having thermal insulation properties. For example, Patent Literature 2 describes production of a solvent containing gel sheet by a continuous method.

CITATION LIST

Patent Literature

Patent Literature 1: JP 2001-179866 A
Patent Literature 2: JP 4898435 B

SUMMARY OF INVENTION

Technical Problem

However, in the case of the thermal insulation material using a resin foam, the foam needs to be thick to obtain good thermal insulation performance; a reduction in thickness of the thermal insulation layer is difficult. On the other hand, the gel sheet described in Patent Literature 2 is produced by impregnating a gel sheet into a core material. Because the aerogels are difficult to handle, it is difficult to form an aerogel layer on a support to achieve a lower thickness, and its productivity is problematic.

The present invention has been made in consideration of the circumstances above, and an object of the present invention is to provide a production method for an aerogel laminate which has superior productivity and enables the formation of an aerogel layer in the form of a thin film, and an aerogel laminate roll.

Solution to Problem

The present invention provides a production method for an aerogel laminate including a support, and an aerogel layer disposed on the support and having a thickness of 200 μm or less, the method comprising a step of washing a wet gel laminate including the support and a wet gel layer disposed on the support by a roll-to-roll scheme.

The above thickness of the wet gel layer may be 400 μm or less.

The above wet gel may contain a gel formed from a sol containing at least one selected from the group consisting of polysiloxane compounds having a reactive group in the molecule and hydrolysis products of the polysiloxane compounds, or may contain a gel formed from a sol containing silica particles.

The present invention provides an aerogel laminate roll prepared by winding an aerogel laminate around a roll core, the aerogel laminate including a support and an aerogel layer disposed on the support and having a thickness of 200 μm or less.

The above aerogel layer may be a layer containing an aerogel having a structure derived from polysiloxane.

The above aerogel layer may be a layer prepared by drying a wet gel formed from a sol containing at least one selected from the group consisting of polysiloxane compounds having a reactive group in the molecule and hydrolysis products of the polysiloxane compounds, or may be a layer prepared by drying a wet gel formed from a sol containing silica particles.

Advantageous Effects of Invention

According to the present invention, a production method for an aerogel laminate which has superior productivity and enables formation of an aerogel layer in the form of a thin film can be provided. According to the present invention, an aerogel laminate roll can be provided in which an aerogel layer formed in the form of a thin film is laminated on a support.

DESCRIPTION OF EMBODIMENTS

An Embodiment of the present invention will be described below in detail occasionally with reference to a drawing, provided that the present invention be not limited to the following Embodiment.

[Aerogel Laminate Roll]

The aerogel laminate roll according to the Embodiment includes a cylindrical roll core, and an aerogel laminate wound around the roll core into a roll and having a thickness of 200 μm or less.

(Aerogel Laminate)

Figure 1:
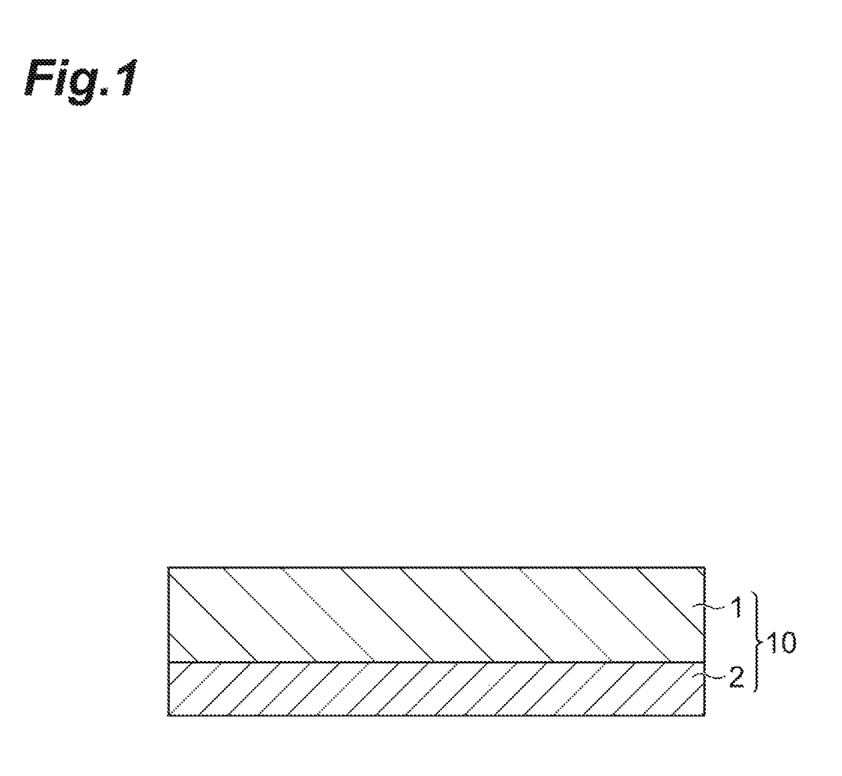
FIG. 1 is a schematic cross-sectional view of the aerogel laminate according to the Embodiment.

The aerogel laminate according to the Embodiment has a structure in which an aerogel layer having a thickness of 200 μm or less is laminated on a support. The aerogel layer has such high pliability that enables the formation of an aerogel into a sheet, which was difficult with respect to handling properties in the related art, and enables integration with the support; for this reason, the aerogel laminate 10 can be handled by winding the aerogel laminate around a cylindrical roll core.

FIG. 1 is a cross-section schematically illustrating the aerogel laminate 10 according to the Embodiment. As illustrated in FIG. 1, the aerogel laminate has a structure in which the aerogel layer 1 is laminated on the support 2.

<Aerogel Layer>

The aerogel layer according to the Embodiment is composed of an aerogel. In a narrow sense, a dried gel obtained by a supercritical drying method from a wet gel is called as aerogel, a dried gel obtained by drying at the atmospheric pressure therefrom is called as xerogel, and a dried gel obtained by freeze-drying therefrom is called as cryogel, however in this Embodiment a low density dried gel obtained from a wet gel without using the above drying techniques is called as aerogel. In other words, aerogel in the Embodiment means aerogel in a broad sense, namely "Gel comprised of a microporous solid in which the dispersed phase is a gas". Generally the inside of an aerogel is configured as a networked microstructure, having a cluster structure in which approx. 2 to 20-nm aerogel particles are bonded together. There are pores in a size less than 100 nm among skeletons formed by the clusters to constitute a three-dimensional microporous structure. In this regard, an aerogel according to the Embodiment is a silica aerogel containing silica as a main component. Examples of a silica aerogel include a so-called organic-inorganic hybridized silica aerogel, in which an organic group such as a methyl group, or an organic chain is introduced. The aerogel layer may be a layer containing an aerogel having a structure derived from polysiloxane.

Examples of the aerogel according to the Embodiment include the following modes. By using these modes, it is easy to obtain an aerogel having high thermal insulation properties and high flexibility and enabling formation of a thin film. It should be noted that use of each of these modes is not always intended to obtain an aerogel specified in the Embodiment. By using each of the modes, an aerogel having thermal insulation properties and flexibility and enabling formation of a thin film according to each of the modes can be obtained.

(First Mode)

An aerogel according to the Embodiment may have a structure expressed by the following Formula (1).

[Chemical Formula 1]

(1)

In Formula (1), $R_1$ and $R_2$ each independently represent an alkyl group or an aryl group, $R_3$ and $R_4$ each independently represent an alkylene group. Examples of an aryl group include a phenyl group, and a substituted phenyl group. Examples of a substituent of a substituted phenyl group include an alkyl group, a vinyl group, a mercapto group, an amino group, a nitro group, and a cyano group.

When the structure is introduced into the skeleton of an aerogel, an aerogel, which has a low thermal conductivity coefficient, and is flexible, may be obtained. From such a viewpoint, in Formula (1), $R_1$ and $R_2$ may be each independently a C1 to C6 alkyl group or a phenyl group. The alkyl group may be a methyl group. Moreover, in Formula (1), $R_3$ and $R_4$ may be each independently a C1 to C6 alkylene group. The alkylene group may be an ethylene group or a propylene group.

(Second Mode)

The aerogel according to the Embodiment is an aerogel having a ladder structure comprising a strut and a bridge, and may be an aerogel in which a bridge has a structure represented by the following Formula (2). When such a ladder structure is introduced into the skeleton of the aerogel, the heat resistance and the mechanical strength can be improved. In this regard, a "ladder structure" in the Embodiment is one having 2 struts and bridges connecting the struts together (one with a so-called "ladder" shape). In the present mode, the skeleton of an aerogel may be configured with a ladder structure, or an aerogel may have a ladder structure only partly.

[Chemical Formula 2]

(2)

In Formula (2), $R_6$ and $R_7$ each independently represent an alkyl group or an aryl group, and b represents an integer of 1 to 50. Examples of the aryl group include a phenyl group, and a substituted phenyl group. Examples of a substituent of a substituted phenyl group include an alkyl group, a vinyl group, a mercapto group, an amino group, a nitro group, and a cyano group. Further, in Formula (2), in a case where b is an integer of 2 or higher, 2 or more $R_6$ may be respectively the same or different, and similarly 2 or more $R_7$ may be respectively the same or different.

When the structure is introduced into the skeleton of an aerogel, an aerogel having flexibility superior to, for example, an aerogel having a structure originated from a conventional ladder-form silsesquioxane (namely that having a structure expressed by the following Formula (X)) is obtained. In this regard, the structure of a bridge in an aerogel having a structure originated from a conventional ladder-form silsesquioxane is —O— as shown in the following Formula (X), however in an aerogel according to the Embodiment the structure of a bridge is a structure expressed by the Formula (2) (polysiloxane structure).

[Chemical Formula 3]

(X)

In Formula (X), R represents a hydroxy group, an alkyl group, or an aryl group.

Although there is no particular restriction on the structure to become a strut and the chain length thereof as well as the interval between the structures to become bridges, a ladder structure may have a structure expressed by the following Formula (3) from the viewpoint of improvement of heat resistance and mechanical strength.

[Chemical Formula 4]

(3)

In Formula (3), $R_5$, $R_6$, $R_7$ and $R_8$ each independently represent an alkyl group or an aryl group, a and c each independently represent an integer of 1 to 3000, and b represents an integer of 1 to 50. In this case, examples of an aryl group include a phenyl group, and a substituted phenyl group. Examples of a substituent of a substituted phenyl group include an alkyl group, a vinyl group, a mercapto group, an amino group, a nitro group, and a cyano group. Further, in Formula (3), in a case where b is an integer of 2 or higher, 2 or more $R_6$ may be respectively the same or different, and similarly 2 or more $R_7$ may be respectively the same or different. Further, in Formula (3), in a case where a is an integer of 2 or higher, 2 or more $R_5$ may be respectively the same or different, and similarly in a case where c is an integer of 2 or higher, 2 or more $R_8$ may be respectively the same or different.

In Formulas (2) and (3), $R_5$, $R_6$, $R_7$ and $R_8$ (provided that $R_5$ and $R_8$ are limited to Formula (3)) each independently may be, for example, a C1 to C6 alkyl group, or a phenyl group from the viewpoint of achieving superior flexibility. The alkyl group may be a methyl group. In Formula (3), a and c may be each independently 6 to 2000, or may be also 10 to 1000. In Formulas (2) and (3), b may be 2 to 30, or may be also 5 to 20.

(Third Mode)

The aerogel according to the Embodiment may be obtained by drying a wet gel formed from a sol containing at least one selected from the group consisting of polysiloxane compounds having a reactive group in the molecule and hydrolysis products of the polysiloxane compounds (hereinafter, these are may be occasionally called collectively as "polysiloxane compounds and the like"). Namely, the aerogel layer may be composed of a layer prepared by drying a wet gel formed from a sol containing at least one selected from the group consisting of polysiloxane compounds having a reactive group in the molecule and hydrolysis products of the polysiloxane compounds. It should be noted that the aerogel described above may also be obtained by drying a wet gel formed from a sol containing at least one selected from the group consisting of polysiloxane compounds having a reactive group in the molecule and hydrolysis products of the polysiloxane compounds. The aerogel layer according to the Embodiment may be a layer prepared by drying a wet gel derived from a sol containing at least one selected from the group consisting of polysiloxane compounds having a reactive group in the molecule and hydrolysis products of the polysiloxane compounds. The aerogel according to the Embodiment can have a three-dimensional network structure derived from the above sol.

Examples of the reactive group having a polysiloxane compound include, but should not be particularly limited to, an alkoxy group, a silanol group, a hydroxyalkyl group, an epoxy group, a polyether group, a mercapto group, a carboxyl group, and a phenol group. Polysiloxane compounds having any of the reactive groups may be used singly, or in a combination of 2 or more thereof. From the viewpoint of enhancing the flexibility of the aerogel, examples of the reactive group include an alkoxy group, a silanol group, a hydroxyalkyl group and a polyether group; furthermore, from the viewpoint of enhancing the compatibility of the sol, examples thereof include an alkoxy group and a hydroxyalkyl group. From the viewpoint of enhancement of the reactivity of a polysiloxane compound and reduction of the thermal conductivity coefficient of an aerogel, the carbon number of an alkoxy group and a hydroxyalkyl group may be 1 to 6, however from the viewpoint of improving further the flexibility of an aerogel it may be also 2 to 4.

Examples of a polysiloxane compound having a hydroxyalkyl group in the molecule include those having a structure expressed by the following Formula (4). A structure expressed by the above Formula (1) may be introduced in the skeleton of an aerogel by using a polysiloxane compound having a structure expressed by the following Formula (4).

[Chemical Formula 5]

(4)

In Formula (4), $R_9$ represents a hydroxyalkyl group, $R_{10}$ represents an alkylene group, $R_{11}$ and $R_{12}$ each independently represent an alkyl group or an aryl group, and n represents an integer of 1 to 50. In this case, examples of an aryl group include a phenyl group, and a substituted phenyl group. Examples of a substituent of the substituted phenyl group include an alkyl group, a vinyl group, a mercapto group, an amino group, a nitro group, and a cyano group. Further, in Formula (4), 2 $R_9$ may be respectively the same or different, and similarly 2 $R_{10}$ may be respectively the same or different. Further, in Formula (4), 2 or more $R_{11}$ may be respectively the same or different, and similarly 2 or more $R_{12}$ may be respectively the same or different.

When a wet gel generated from a sol containing any of polysiloxane compounds and the like having the above structure is used, an aerogel which has a low thermal conductivity coefficient and is flexible can be obtained further easily. From such a viewpoint, examples of $R_9$ in Formula (4) include C1 to C6 hydroxyalkyl groups; and examples thereof specifically include a hydroxyethyl group and a hydroxypropyl group. Examples of $R_{10}$ in Formula (4) include C1 to C6 alkylene groups; and examples thereof specifically include an ethylene group and a propylene group. In Formula (4), $R_{11}$ and $R_{12}$ may be each independently a C1 to C6 alkyl group or a phenyl group. The alkyl group may be a methyl group. In Formula (4), n may be 2 to 30, or may be also 5 to 20.

For a polysiloxane compound having a structure expressed by Formula (4), a commercial product may be used, and examples thereof include compounds, such as X-22-160AS, KF-6001, KF-6002, and KF-6003 (all produced by Shin-Etsu Chemical Co., Ltd.), and compounds, such as XF42-B0970, and Fluid OFOH 702-4% (all produced by Momentive Performance Materials Inc.).

Examples of a polysiloxane compound having an alkoxy group in the molecule include those having a structure expressed by the following Formula (5). A ladder structure having a bridge expressed by the above Formula (2) may be introduced in the skeleton of an aerogel by using a polysiloxane compound having a structure expressed by the following Formula (5).

[Chemical Formula 6]

(5)

In Formula (5), $R_{14}$ represents an alkyl group or an alkoxy group, $R_{15}$ and $R_{16}$ each independently represent an alkoxy group, $R_{17}$ and $R_{18}$ each independently represent an alkyl group or an aryl group, and m represents an integer of 1 to 50. In this case, examples of an aryl group include a phenyl group, and a substituted phenyl group. Examples of a substituent of a substituted phenyl group include an alkyl group, a vinyl group, a mercapto group, an amino group, a nitro group, and a cyano group. Meanwhile, in Formula (5), 2 $R_{14}$ may be respectively the same or different, 2 $R_{15}$ may be respectively the same or different, and similarly 2 $R_{16}$ may be respectively the same or different. Further, in Formula (5), in a case where m is an integer of 2 or higher, 2 or more $R_{17}$ may be respectively the same or different, and similarly 2 or more $R_{18}$ may be respectively the same or different.

When a wet gel generated from a sol containing any of polysiloxane compounds and the like having the above structure is used, an aerogel which has a low thermal conductivity coefficient and is flexible can be obtained further easily. From such a viewpoint, examples of $R_{14}$ in Formula (5) include C1 to C6 alkyl groups and C1 to C6 alkoxy groups; and examples thereof specifically include a methyl group, a methoxy group and an ethoxy group. In Formula (5), $R_{15}$ and $R_{16}$ may be each independently a C1 to C6 alkoxy group. Examples of the alkoxy group include a methoxy group and an ethoxy group. In Formula (5), $R_{17}$ and $R_{18}$ may be each independently a C1 to C6 alkyl group or a phenyl group. The alkyl group may be a methyl group. In Formula (5), m may be 2 to 30, or may be also 5 to 20.

A polysiloxane compound having a structure expressed by Formula (5) may be obtained for example referring appropriately to production methods reported in JP 2000-26609 A, PJ 2012-233110 A, etc.

Since an alkoxy group is hydrolyzable, it is possible that a polysiloxane compound having an alkoxy group in the molecule exists in a sol as a hydrolysis product, therefore a polysiloxane compound having an alkoxy group in the molecule and a hydrolysis product thereof may coexist. Further, in a polysiloxane compound having an alkoxy group in the molecule, all of the alkoxy groups in the molecule may be hydrolyzed, or only part of them may be hydrolyzed.

These polysiloxane compounds having a reactive group in the molecule and hydrolysis products of the polysiloxane compounds may be used singly or in combinations of 2 or more.

When the aerogel according to the Embodiment is produced, sol containing polysiloxane compounds and the like described above, can further contain at least one selected from the group consisting of silicon compounds having a hydrolyzable functional group in the molecule and hydrolysis products of the silicon compounds (hereinafter, these are may be occasionally called collectively as "silicon compounds and the like"). The number of silicon atoms in the molecule of the silicon compound can be 1 or 2.

Examples of the silicon compounds having a hydrolyzable functional group in the molecule include, but should not be particularly limited to, alkyl silicon alkoxides. Among these alkyl silicon alkoxides, the number of the hydrolyzable functional groups may be 3 or less from the viewpoint of improvement of water resistance. Examples of the alkyl silicon alkoxides include methyltrimethoxysilane, methyldimethoxysilane, and ethyltrimethoxysilane.

Further, vinyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane, etc., which are silicon compounds having 3 or less hydrolyzable functional groups as well as a reactive group in the molecule, may be also used.

Further, bis(trimethoxysilyl)methane, bis(trimethoxysilyl)ethane, bis(trimethoxysilyl)hexane, etc., which are silicon compounds having 3 or less hydrolyzable functional groups at a molecular terminal, may be also used.

The silicon compounds may be used singly, or in a combination of 2 or more thereof.

(Fourth Mode)

The aerogel according to the Embodiment may be obtained by drying a wet gel formed from a sol containing silica particles. Namely, the aerogel layer may be composed of a layer prepared by drying a wet gel formed from a sol containing silica particles. The aerogel layer is a layer in which the silica particles are formed into a composite. It should be noted that the aerogels described above may also be obtained by drying a wet gel formed from a sol containing silica particles as described above.

The aerogel containing silica particles according to the Embodiment can have a structure represented by the following Formula (6).

[Chemical Formula 7]

(6)

In Formula (6), $R_{19}$ represents an alkyl group. Examples of the alkyl group include a C1 to C6 alkyl group, and examples thereof specifically include a methyl group.

The aerogel containing silica particles according to the Embodiment may have a structure expressed by the following Formula (7).

[Chemical Formula 8]

(7)

In Formula (7), $R_{20}$ and $R_{21}$ each independently represent an alkyl group. Examples of the alkyl group include a C1 to C6 alkyl group, and examples thereof specifically include a methyl group.

The aerogel containing silica particles according to the Embodiment may have a structure expressed by the following Formula (8).

[Chemical Formula 9]

(8)

In Formula (8), $R_{22}$ represents an alkylene group. Examples of the alkylene group include a C1 to C10 alkylene group, and examples thereof specifically include an ethylene group, and a hexylene group.

The silica particles can be used without limitation in particular, and examples thereof include amorphous silica particles. Examples of the amorphous silica particles include fused silica particles, fumed silica particles, and colloidal silica particles. Among these, colloidal silica particles have high monodispersity to readily suppress the aggregation thereof in the sol.

The shapes of the silica particles are not particularly limited; examples thereof include spherical, cocoon shaped, and associated form. Among these, by using spherical particles as the silica particles, the aggregation thereof in the sol is readily suppressed. The average primary particle diameter of the silica particles can be 1 nm or more, may be 5 nm or more, or may be 10 nm or more because appropriate strength is readily given to the aerogel and an aerogel superior in resistance to contraction during drying is obtained more easily. On the other hand, the average primary particle diameter of the silica particles can be 500 nm or less, may be 300 nm or less, or may be 250 nm or less because the solid heat conduction of the silica particles is readily suppressed and an aerogel having high thermal insulation properties is readily obtained. Namely, the average primary particle diameter of the silica particles can be 1 to 500 nm, may be 5 to 300 nm, or may be 10 to 250 nm.

(Other Modes)

The aerogel layer according to the Embodiment may be composed of a layer containing an aerogel having a structure derived from polysiloxane. Examples of the structure derived from polysiloxane include a structure represented by the above Formula (1), (2), (3), (6), (7) or (8). Accordingly, the aerogel according to the Embodiment may have at least one among the structures represented by the above formulae (6), (7) and (8) without containing silica particles.

Because an aerogel superior in resistance to contraction during drying is obtained more easily, the number of silanol groups per 1 g of silica particles can be $10 \times 10^{18}$/g or more, may be $50 \times 10^{18}$/g or more, or may be $100 \times 10^{18}$/g or more. On the other hand, because a homogeneous aerogel is readily obtained, the number of silanol groups per 1 g of silica particles can be $1000 \times 10^{18}$/g or less, may be $800 \times 10^{18}$/g or less, or may be $700 \times 10^{18}$/g or less. Namely, the number of silanol groups per 1 g of silica particles can be $10 \times 10^{18}$ to $1000 \times 10^{18}$/g, may be $50 \times 10^{18}$ to $800 \times 10^{18}$/g, or may be $100 \times 10^{18}$ to $700 \times 10^{18}$/g.

The content of the polysiloxane compound and the hydrolysis product of the polysiloxane compound contained in the above sol can be 5 parts by mass or more, and may be 10 parts by mass or more relative to the total amount of 100 parts by mass of the sol because good reactivity is more readily obtained; the content can be 50 parts by mass or less, and may be 30 parts by mass or less because good compatibility is more readily obtained. Namely, the content of the polysiloxane compound and the hydrolysis product of the polysiloxane compound can be 5 to 50 parts by mass, or may be 10 to 30 parts by mass relative to the total amount of 100 parts by mass of the sol.

Moreover, in the case where the above sol further contains silicon compounds and the like, the total sum of the content of polysiloxane compounds and the like and that of silicon compounds and the like can be 5 parts by mass or more, and may be 10 parts by mass or more relative to the total amount of 100 parts by mass of the sol because good reactivity is more readily obtained, and can be 50 parts by mass or less, and may be 30 parts by mass or less because good compatibility is more readily obtained. Namely, the total sum of the content of polysiloxane compounds and the like and that of silicon compounds and the like can be 5 to 50 parts by mass, and may be 10 to 30 parts by mass. At this time, the ratio of the content of polysiloxane compounds and the like to the content of the hydrolysis product of silicon compounds and the like can be 1:0.5 to 1:4, and may be 1:1 to 1:2. Better compatibility is more readily obtained if the ratio of the contents of the compounds is 1:0.5 or more; moreover, the contraction of the gel is more readily suppressed if the ratio is 1:4 or less.

Because appropriate strength is readily given to the aerogel and an aerogel superior in resistance to contraction during drying is obtained more easily, the content of the silica particles contained in the above sol can be 1 part by mass or more, and may be 4 parts by mass or more relative to the total amount of 100 parts by mass of the sol. On the other hand, because the solid heat conduction of the silica particles is readily suppressed and an aerogel having high thermal insulation properties is readily obtained, the content of the silica particles contained in the above sol can be 20 parts by mass or less, and may be 15 parts by mass or less. Namely, the content of the silica particles can be 1 to 20 parts by mass, and may be 4 to 15 parts by mass relative to the total amount of 100 parts by mass of the sol.

Because good thermal insulation properties are readily obtained, the thickness of the aerogel layer can be 1 μm or more, may be 10 μm or more, or may be 30 μm or more. On the other hand, from the viewpoint of a reduction in thickness, the thickness of the aerogel layer can be 200 μm or less, may be 100 μm or less, or may be 80 μm or less. Namely, the thickness of the aerogel layer can be 1 to 200 μm, may be 10 to 100 μm, or may be 30 to 80 μm.

From the viewpoint of obtaining higher strength and flexibility, the density at 25° C. of the aerogel layer can be 0.05 g/cm$^3$ or more, may be 0.1 g/cm$^3$ or more, or may be 0.2 g/cm$^3$ or more. On the other hand, from the viewpoint of obtaining higher thermal insulation properties, the density at 25° C. of the aerogel layer can be 0.3 g/cm$^3$ or less, may be 0.25 g/cm$^3$ or less, or may be 0.2 g/cm$^3$ or less. Namely, the density at 25° C. of the aerogel layer can be 0.05 to 0.3 g/cm$^3$, may be 0.1 to 0.25 g/cm$^3$, or may be 0.1 to 0.2 g/cm$^3$.

From the viewpoint of obtaining higher thermal insulation properties, the porosity at 25° C. of the aerogel layer can be 85% or more, or may be 87% or more; from the viewpoint of obtaining higher strength and flexibility, the porosity at 25° C. of the aerogel layer can be 95% or less, or may be 93% or less. Namely, the porosity at 25° C. of the aerogel layer can be 85 to 95%, or may be 87 to 93%.

The density and porosity of the aerogel layer can be measured by mercury intrusion porosimetry according to DIN66133. As a measurement apparatus, AutoPore IV9520 (made by SHIMADZU Corporation, product name) can be used, for example.

<Support>

The support according to the Embodiment is a non-aerogel layer; the configuration of the support is not particularly limited, and may be a single layer or a multi-layer. Examples of supporting members include film-shaped supports, and foil-shaped supports.

The film-shaped support is a support prepared by molding a high molecule raw material into a thin film, and examples thereof include resin films of polyolefin, polyester, polycarbonate and polyimide. The resin film may be a metal deposited film. Examples of the metal deposited film include aluminum deposited films and silver deposited films. The foil-shaped support is a support prepared by molding a metal raw material into a thin film, and examples thereof include aluminum foils and copper foils.

The surface of the support on which the aerogel layer is not laminated may be subjected to a releasing treatment.

The thickness of the support is not particularly limited; from the viewpoint of the handling properties, the thickness can be 3 μm or more, may be 5 μm or more, or may be 7 μm or more. On the other hand, from the viewpoint of enhancing the thermal insulation properties, the thickness of the support can be 100 μm or less, may be 80 μm or less, or may be 50 μm or less. Namely, the thickness of the support can be 3 to 100 μm, may be 5 to 80 μm, or may be 7 to 50 μm.

<Method of Producing Aerogel Laminate>

In the production method for an aerogel laminate according to the Embodiment, an aerogel laminate can be produced by a method comprising a step of washing a wet gel laminate including the support and a wet gel layer disposed on the support by a roll-to-roll scheme. The aerogel laminate according to the Embodiment includes a support, and an aerogel layer disposed on the support and having a thickness of 200 μm or less.

Namely, the aerogel laminate according to the Embodiment can be produced by a production method mainly including a step of preparing a sol of producing a sol for forming an aerogel, a step of preparing a wet gel of applying the sol obtained in the step of preparing the sol onto a support rolled into a roll while the support is being unwound from the roll, gelating the sol, and aging the sol to obtain a wet gel layer, a washing step of washing a wet gel laminate having a wet gel layer obtained in the step of preparing the wet gel laminated thereon by a roll-to-roll scheme, and a drying step of drying the washed wet gel laminate to produce an aerogel laminate. The washed wet gel laminate may be subjected to solvent exchange before going to the drying step, when necessary. The sol in the Embodiment refers to a state before a gelation reaction occurs where silicon compounds and the like described above, polysiloxane compounds and the like in some cases, and the silica particles are dissolved or dispersed in a solvent. The wet gel refers to a wet gel solid having no fluidity while containing a liquid medium.

The above production step can use a method of continuously treating the film unwound from the roll, and winding the film into a roll again. For example, an aerogel laminate roll can be produced as follows: the step of preparing the wet gel of unwinding the support wound into a roll to form a wet gel layer on the support, the washing step, the solvent exchange step (when necessary), and the drying step are continuously performed, and the formed aerogel laminate is wound into a roll. Moreover, the wet gel laminate formed in the step of preparing the wet gel may be wound into a roll. In this case, in the washing step, the wet gel layer may be washed while the roll-shaped wet gel laminate is being fed from the roll, and may be again wound into a roll; or the process may go to the drying step without winding the wet gel laminate.

Each step in a method for producing an aerogel laminate according to the Embodiment will be described below.

(Step of Preparing Sol)

The step of preparing a sol is a step of mixing the silicon compound described above with a solvent containing the polysiloxane compound and/or silica particles in some cases to perform a hydrolysis reaction, and performing a sol gel reaction to obtain a semi-gelated sol coating solution. In this step, an acid catalyst may be further added in a solvent for promoting the hydrolysis reaction. Further, a surfactant, a thermally hydrolyzable compound, etc. may be also added in a solvent as disclosed in JP 5250900 B. Furthermore, a base catalyst may be added to promote the gelation reaction. The silica particles may be contained in the sol from the viewpoint of reducing the time taken in this step, and the step of preparing the wet gel described later to reduce the heating and drying temperatures.

The solvent is not particularly limited in the applying step described later as long as good coating properties are obtained; for example, water, or a mixed solution of water and alcohol can be used. Examples of an alcohol include methanol, ethanol, n-propanol, 2-propanol, n-butanol, 2-butanol and t-butanol. Among these, water can be used because the surface tension is high and the volatility is low.

Examples of an acid catalyst include an inorganic acid, such as hydrofluoric acid, hydrochloric acid, nitric acid, sulfuric acid, sulfurous acid, phosphoric acid, phosphorous acid, hypophosphorous acid, bromic acid, chloric acid, chlorous acid and hypochlorous acid; an acidic phosphate, such as acidic aluminum phosphate, acidic magnesium phosphate and acidic zinc phosphate; and an organic carboxylic acid, such as acetic acid, formic acid, propionic acid, oxalic acid, malonic acid, succinic acid, citric acid, malic acid, adipic acid and azelaic acid. Among them, as an acid catalyst for further improving the water resistance of an obtained aerogel layer, an organic carboxylic acid can be used, specific examples of the organic carboxylic acid include acetic acid, formic acid, propionic acid, oxalic acid or malonic acid, and the organic carboxylic acid may be acetic acid. They may be used singly, or in a combination of 2 or more thereof.

When an acid catalyst is used, a hydrolysis reaction of a silicon compound and a polysiloxane compound is promoted, and a sol may be obtained in a shorter time.

The addition amount of an acid catalyst with respect to the total amount of a silicon compound and a polysiloxane compound as 100 parts by mass may be 0.001 to 0.1 part by mass.

As a surfactant a nonionic surfactant, an ionic surfactant, etc. may be used. The surfactants may be used singly, or in a combination of 2 or more thereof.

As a nonionic surfactant, for example, one comprising a hydrophilic moiety such as polyoxyethylene and a hydrophobic moiety composed mainly of an alkyl group, or one comprising a hydrophilic moiety such as polyoxypropylene may be used. Examples of one comprising a hydrophilic moiety such as polyoxyethylene and a hydrophobic moiety composed mainly of an alkyl group include polyoxyethylene nonylphenyl ether, polyoxyethylene octylphenyl ether, and polyoxyethylene alkyl ether. Examples of one comprising a hydrophilic moiety such as polyoxypropylene include polyoxypropylene alkyl ether, and a block copolymer of polyoxyethylene and polyoxypropylene.

As an ionic surfactant, a cationic surfactant, an anionic surfactant, an amphoteric surfactant, and the like can be used. Examples of the cationic surfactant include cetyltrimethylammonium bromide and cetyltrimethylammonium chloride. Examples of an anionic surfactant include sodium dodecyl sulfonate. Examples of an amphoteric surfactant include an amino acid surfactant, a betaine surfactant, and an amine oxide surfactant. Examples of an amino acid surfactant include acylglutamic acid. Examples of a betaine surfactant include lauryldimethylaminoacetic acid betaine, and stearyldimethylaminoacetic acid betaine. Examples of an amine oxide surfactant include lauryldimethylamine oxide.

It is conceived that such a surfactant acts to suppress phase separation by reducing a difference in a chemical affinity between a solvent in a reaction system and a growing siloxane polymer in an applying step described below.

Although the addition amount of a surfactant depends on the type of a surfactant, and the type and amount of a silicon compound and a polysiloxane compound, it may be for example 1 to 100 parts by mass with respect to the total amount of a silicon compound and a polysiloxane compound as 100 parts by mass, and may be also 5 to 60 parts by mass.

It is conceived that a thermally hydrolyzable compound generates a base catalyst by thermal hydrolysis to make a reaction solution basic, thereby promoting a sol-gel reaction. Therefore, there is no particular restriction on the thermally hydrolyzable compound, insofar as it is a compound able to make a reaction solution basic after hydrolysis, and examples thereof include urea; an acid amide, such as formamide, N-methylformamide, N,N-dimethylformamide, acetamide, N-methylacetamide and N,N-dimethylacetamide; and a cyclic nitrogen compound, such as hexamethylenetetramine Among them, especially urea is apt to achieve the above promotion effect.

There is no particular restriction on the addition amount of a thermally hydrolyzable compound, insofar as it is an amount sufficient to promote thoroughly a sol-gel reaction. For example, when urea is used as a thermally hydrolyzable compound, its addition amount may be 1 to 200 parts by mass with respect to the total amount of a silicon compound and a polysiloxane compound as 100 parts by mass, and may be also 2 to 150 parts by mass. When the addition amount is 1 part by mass or more, excellent reactivity may be obtained more easily, and when the same is 200 parts by mass or less, precipitation of a crystal and decrease in a gel density may be suppressed more easily.

Hydrolysis in a step of preparing a sol may be carried out, for example, in a temperature environment of 20 to 60° C. for 10 min to 24 hours, or may be carried out in a temperature environment of 50 to 60° C. for 5 min to 8 hours, subject to the type and quantity of a silicon compound, a polysiloxane compound, a silica particle, an acid catalyst, a surfactant, or the like in a mixture liquid. By this means, hydrolyzable functional groups in a silicon compound or a polysiloxane compound are hydrolyzed adequately, so that a hydrolysis product of a silicon compound or a hydrolysis product of a polysiloxane compound can be obtained more surely.

However, in a case where a thermally hydrolyzable compound is added into a solvent, the temperature environment of a step of preparing a sol may be adjusted to a temperature at which hydrolysis of the thermally hydrolyzable compound is suppressed and gelation of a sol is suppressed. Such a temperature is optional insofar as hydrolysis of a thermally hydrolyzable compound is suppressed at the temperature. For example, in a case where urea is used as a thermally hydrolyzable compound, the temperature environment of a step of preparing a sol may be 0 to 40° C., or also 10 to 30° C.

Examples of a base catalyst include an alkali metal hydroxide, such as lithium hydroxide, sodium hydroxide, potassium hydroxide and cesium hydroxide; an ammonium compound, such as ammonium hydroxide, ammonium fluoride, ammonium chloride and ammonium bromide; a basic sodium phosphate salt, such as sodium metaphosphate, sodium pyrophosphate and sodium polyphosphate; an aliphatic amine, such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino) propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propyl amine, 3-methoxyamine, dimethylethanolamine, methyldiethanolamine, diethanolamine and triethanolamine; and a nitrogen-containing heterocyclic compound, such as morpholine, N-methylmorpholine, 2-methylmorpholine, piperazine and its derivative, piperidine and its derivative, and imidazole and its derivative. Among them, ammonium hydroxide (ammonia water) is superior, because it has high volatility so that it hardly remains in an aerogel layer after drying to impair the water resistance, and further because it is economical. The base catalyst may be used singly, or in a combination of 2 or more thereof.

By using a base catalyst, a dehydration condensation reaction and/or a dealcoholization condensation reaction, of any of silicon compounds and polysiloxane compounds, and a silica particle in a sol may be promoted such that gelation of the sol is performed in a shorter time. Especially ammonia is highly volatile and hardly remains in an aerogel layer, therefore when ammonia is used as a base catalyst, an aerogel layer with improved water resistance may be obtained.

The addition amount of a base catalyst may be 0.5 to 5 parts by mass, or may be also 1 to 4 parts by mass with respect to the total amount of silicon compounds and polysiloxane compounds as 100 parts by mass. When the addition amount of a base catalyst is 0.5 part by mass or more, gelation can be carried out in a shorter time, and when it is 5 parts by mass or less, decrease in water resistance may be further suppressed.

The sol needs to be in a semi-gelated state in the sol gel reaction of the step of preparing a sol for the purpose of obtaining good coating properties in the applying step described later. It is preferred that this reaction be performed in a tightly closed container such that the solvent and the base catalyst do not volatilize. Although the gelation temperature varies according to the types and the amounts of the silicon compound, the polysiloxane compound, the silica particles, the acid catalyst, the surfactant, and base catalyst, and the like in the sol, the gelation temperature can be 30 to 90° C., and may be 40 to 80° C. If the gelation temperature is controlled to be 30° C. or more, the gelation can be performed in a shorter time, and if the gelation temperature is controlled to be 90° C. or less, rapid gelation can be suppressed.

Although the time for the sol gel reaction varies according to the gelation temperature, the gelation time can be shortened compared to the sol used in conventional aerogels in the case where the silica particles are contained in the sol in the Embodiment. This reason is inferred as follows: the silanol groups and/or reactive groups in silicon compounds and the like and polysiloxane compounds and the like in the sol form hydrogen bonds and/or chemical bonds with the silanol groups in the silica particles. The gelation time can be 10 to 360 minutes, and may be 20 to 180 minutes. By controlling the gelation time to be 10 minutes or more, the viscosity of the sol is enhanced to readily obtaining good applicability in the applying step described later, and by controlling the gelation time to be 360 minutes or less, the complete gelation of the sol is suppressed to readily obtain the adhesiveness to the support, which is a non-aerogel layer.

(Step of Preparing Wet Gel)

The step of preparing the wet gel comprises an applying step of applying the semi-gelated sol coating solution obtained in the above step of preparing the sol onto the support, and gelating the sol to form a gel layer, and an aging step of aging the gel layer to form a wet gel layer. Specifically, by applying the above sol coating solution to the support, and drying sol coating solution, the sol coating solution is gelated to form the gel layer on the surface of the support. It is desirable that the adhesive force of the gel layer to the support be ensured.

As an applicator, a die coater, a comma coater, a bar coater, a kiss coater, a roll coater, or the like can be used, and is appropriately used according to the thickness of the wet gel layer. The coating after the sol coating solution is applied can be dried by heating or the like. The thickness of the wet gel layer can be adjusted according to the thickness of the aerogel layer finally formed. From the viewpoint of winding the wet gel laminate into a roll, the upper limit of the thickness of the wet gel layer may be 400 µm or less, 200 µm or less, or 160 µm or less, and the lower limit of the thickness of the wet gel layer can be 1 µm or more, may be 20 µm or more, or may be 60 µm or more.

The drying of the sol coating solution after applied to the support can be performed on the condition such that the moisture content of the gel layer after drying is 10% by mass or more, and the drying may be performed on, for example, the condition such that the moisture content of the gel layer after drying is 50% by mass or more. If the moisture content of the wet gel layer is controlled to be 10% by mass, the adhesiveness to the support is readily obtained.

Although the drying temperature varies according to the moisture content and/or the amount of the organic solvent in the sol coating solution and the boiling point of the organic solvent, the drying temperature can be 50 to 150° C., for example, and may be 60 to 120° C. By controlling the drying temperature to be 50° C. or more, the gelation can be performed in a shorter time, and by controlling the drying temperature to be 150° C. or less, the adhesiveness to the support is readily obtained.

Although the drying time varies according to the drying temperature, the drying time can be 0.2 to 10 minutes, for example, and may be 0.5 to 8 minutes. By controlling the drying time to be 0.2 minutes or more, the wet gel layer is readily formed, and by controlling the drying time to be 10 minutes or less, the adhesiveness to the support is readily obtained. The above drying condition can be appropriately set preliminarily by a simple test.

Moreover, a separator can be further laminated on the surface of the gel layer opposite to the support. By laminating the separator, the transfer of the above wet gel surface to the rear surface of the support when the wet gel laminate is wound into a roll can be prevented. In the case where the separator is laminated, in the applying step, for example, the separator may be laminated after the sol coating solution is applied, or may be laminated after the coating formed of the sol coating solution is dried. Examples of the separator include resin films composed of resins such as polyolefin, polyester, polycarbonate and polyimide, metal foils such as copper foil and aluminum foil, and releasing paper. Among these, a resin film can be used from the viewpoint of keeping the moisture content of the gel layer high, if the separator is laminated after the sol coating solution is applied. The separator may be subjected to a releasing treatment such as a matting treatment or a corona treatment.

The aging step is a step of aging the gel layer, which is formed by the above applying step, through heating to form a wet gel layer. The aging step may be performed while the laminate having the gel layer formed on the support is wound into a roll. In this step, from the viewpoint of suppressing a reduction in the adhesiveness of the wet gel layer to the support, it is preferred that the wet gel layer be aged such that the moisture content of the wet gel layer be 10% by mass or more, and it is more preferred that the wet gel layer be aged such that the moisture content of the wet gel layer be 50% by mass or more. The aging method is not particularly limited as long as the above range is satisfied; examples thereof include a method of aging in a sealed atmosphere, and a method of aging using a thermo-hygrostat which can suppress a reduction in moisture content caused by heating.

The aging temperature can be 40 to 90° C., for example, and may be 50 to 80° C. By controlling the aging temperature to be 40° C. or more, the aging time can be shortened, and by controlling the aging temperature to be 90° C. or less, a reduction in the moisture content can be suppressed.

The aging time can be 1 to 48 hours, for example, and may be 3 to 24 hours. By controlling the aging time to be one hour or more, high thermal insulation properties can be obtained, and by controlling the aging time to be 48 hours or less, high adhesiveness to the support can be obtained.

(Washing Step)

The washing step is a step of washing the wet gel laminate obtained in the above step of preparing the wet gel step by a roll-to-roll scheme (washing step). In the case where the wet gel laminate is wound into a roll, the wet gel laminate is fed from the roll, and is washed. The washing step may further comprise a step of exchanging the solvent for another solvent suitable for the drying step described later (solvent exchange step). The method of washing and solvent exchange is not particularly limited. Although the washing and solvent exchange step can be implemented in the form of performing only the solvent exchange step without performing the step of washing the wet gel laminate, the wet gel layer after aging may be washed from the viewpoint of reducing impurities such as unreacted substances and by-products in the wet gel layer to enable production of an aerogel laminate having higher purity. Because the washing step can be performed by the roll-to-roll scheme to shorten the step of producing the aerogel laminate, the production time and the like, the productivity is superior.

In the washing step, it is preferred that the aerogel layer in the wet gel laminate obtained in the step of preparing a wet gel be repeatedly washed using water or an organic solvent.

As an organic solvent, various organic solvents, such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethyl sulfoxide, acetic acid and formic acid, may be used. The organic solvents may be used singly, or in a combination of 2 or more thereof.

In a solvent exchange step described below, a low surface tension solvent may be used for suppressing contraction of a wet gel layer by drying. However, a low surface tension solvent has in general extremely low mutual solubility with water. Therefore, when a low surface tension solvent is used in a solvent exchange step, it is preferred that the organic solvent used in a washing step is a hydrophilic organic solvent having high mutual solubility with respect to both water and the low surface tension solvent. In this regard, a hydrophilic organic solvent used in a washing step can perform a function of preliminary exchange for a solvent exchange step. For this reason, among these organic solvents described above, hydrophilic organic solvents such as methanol, ethanol, 2-propanol, acetone, and methyl ethyl ketone can be used; furthermore, methanol, ethanol, or methyl ethyl ketone may be used from the viewpoint of economy.

The amount of water or an organic solvent used in a washing step can be an amount enough to exchange the solvent in the wet gel layer, and to wash; the solvent can be used in an amount 3 to 10 times the volume of the wet gel layer. Washing may be repeated until the water content in an aerogel layer after washing reaches 10 mass % or less.

The temperature in a washing step may be not higher than the boiling point of a solvent used for washing, and for example in a case where methanol is used, it may be between approx. 30 and 60° C.

To suppress contraction of the wet gel layer in the drying step described later, the solvent contained in the washed wet gel layer is exchanged for a predetermined exchange solvent in the solvent exchange step. In this case, the exchange efficiency may be enhanced by raising the temperature. Specific examples of an exchange solvent, in a case where drying is performed in a step of drying at the atmospheric pressure and at a temperature less than a critical point of a solvent used for drying, include a low surface tension solvent described below. On the other hand, in the case where supercritical drying is performed, ethanol, methanol, 2-propanol, dichlorodifluoromethane, or carbon dioxide may be used singly or in combinations of 2 or more as the exchange solvent, for example.

Examples of a low surface tension solvent include those having a surface tension of 30 mN/m or less at 20° C. The surface tension may be also 25 mN/m or less, or even 20 mN/m or less. Examples of a low surface tension solvent include an aliphatic hydrocarbon, such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); an aromatic hydrocarbon, such as benzene (28.9), toluene (28.5), m-xylene (28.7), and p-xylene (28.3); a halogenated hydrocarbon, such as dichloromethane (27.9), chloroform (27.2), carbon tetrachloride (26.9), 1-chloropropane (21.8), and 2-chloropropane (18.1); an ether, such as ethyl ether (17.1), propyl ether (20.5), isopropyl ether (17.7), butyl ethyl ether (20.8), and 1,2-dimethoxyethane (24.6); a ketone, such as acetone (23.3), methyl ethyl ketone (24.6), methyl propyl ketone (25.1), and diethyl ketone (25.3); and an ester, such as methyl acetate (24.8), ethyl acetate (23.8), propyl acetate (24.3), isopropyl acetate (21.2), isobutyl acetate (23.7), and ethyl butyrate (24.6). A number in parentheses means a surface tension at 20° C. in unit [mN/m]. Among them, an aliphatic hydrocarbon (such as hexane and heptane) has a low surface tension, and is superior in work environmental property. Further, when a hydrophilic organic solvent, such as acetone, methyl ethyl ketone, and 1,2-dimethoxyethane, among the above solvents is used, it may have also a function of an organic solvent for the washing step. Further, among the above solvents, those with a boiling point at a normal pressure of 100° C. or less may be also used, because drying in a step of drying described below is easy. The solvents may be used singly, or in a combination of 2 or more thereof.

The amount of the solvent used in the solvent exchange step can be an amount such that the solvent in the washed wet gel layer can be sufficiently exchanged, and the solvent can be used in an amount 3 to 10 times the volume of the wet gel layer.

The temperature in a solvent exchange step may be not higher than the boiling point of a solvent used for exchange, and for example in a case where heptane is used, it may be between approx. 30 and 60° C.

In the Embodiment, in the case where the silica particles are contained in the sol, the solvent exchange step is not always essential as described above. A mechanism is conjectured as follows. According to the Embodiment a silica particle functions as a support for a three-dimensional network skeleton of the aerogel, and as a result, the skeleton is supported such that contraction of a gel in a step of drying is suppressed. Consequently, it is conceivable that a gel can be subjected to a step of drying as it is without exchanging a solvent used for washing. As described above, a step of washing and solvent exchange through a step of drying may be simplified according to the Embodiment.

Moreover, in the case where the separator is laminated in the applying step, from the viewpoint of enhancing the washing and solvent exchange efficiency of the wet gel layer, the separator may be removed before the washing step, and may be again laminated after the solvent exchange step.

(Drying Step)

In the drying step, as described above, a wet gel laminate having a wet gel layer subjected to washing and solvent exchange (when necessary) is dried. Thereby, the final aerogel laminate can be obtained.

The drying method is not particularly limited, and known normal pressure drying, supercritical drying, or freeze-drying can be used; among these, normal pressure drying or supercritical drying can be used from the viewpoint of readily producing an aerogel layer having low density. Also, from the viewpoint that production at a low cost is possible, normal pressure drying may be applied. "Normal pressure" in the Embodiment means 0.1 MPa (atmospheric pressure).

The aerogel laminate according to the Embodiment can be obtained by drying the wet gel layer subjected to washing and (when necessary) solvent exchange at a temperature less than the critical point of the solvent used in drying under atmospheric pressure. Although the drying temperature varies according to the type of the exchanged solvent (the solvent used in washing in the case where solvent exchange is not performed) or the heat resistance of the support, the drying temperature can be 60 to 180° C., and may be 90 to 150° C. Although the drying time varies according to the volume of the wet gel layer and the drying temperature, the drying time can be 2 to 48 hours. In the Embodiment, the drying can be accelerated by applying pressure in a range not inhibiting the productivity.

Moreover, pre-drying may be performed before the drying step in the aerogel laminate according to the Embodiment from the viewpoint of enhancing the drying efficiency in normal pressure drying. The pre-drying method is not particularly limited. The pre-drying temperature can be 60 to 180° C., and may be 90 to 150° C. Moreover, the pre-drying time can be 1 to 30 minutes. The aerogel laminate obtained by such pre-drying can be further dried in the drying step.

In the case where the separator is laminated in the washing and solvent exchange step, from the viewpoint of drying efficiency and transportation efficiency, the separator can be removed before pre-drying, and be again laminated after pre-drying. Moreover, in the case where the washing and solvent exchange step to the drying step are continuously performed, the separator can be removed before the washing step, and be again laminated after pre-drying.

An aerogel laminate according to the Embodiment may be obtained also by conducting supercritical drying on a wet gel laminate subjected to washing, and (according to need) solvent exchange. Supercritical drying may be conducted by a publicly known technique. Examples of a method for supercritical drying include a method by which a solvent is removed at a temperature and a pressure not lower than the critical point of a solvent contained in a wet gel layer. Alternatively, examples of a method for supercritical drying include a method by which an aerogel layer is immersed in liquefied carbon dioxide for example under conditions of approx. 20 to 25° C., and 5 to 20 MPa to exchange all or part of the solvent contained in a wet gel layer for carbon dioxide having a lower critical point than that of the solvent, and then carbon dioxide alone, or a mixture of carbon dioxide and the solvent is removed.

Figure 2:
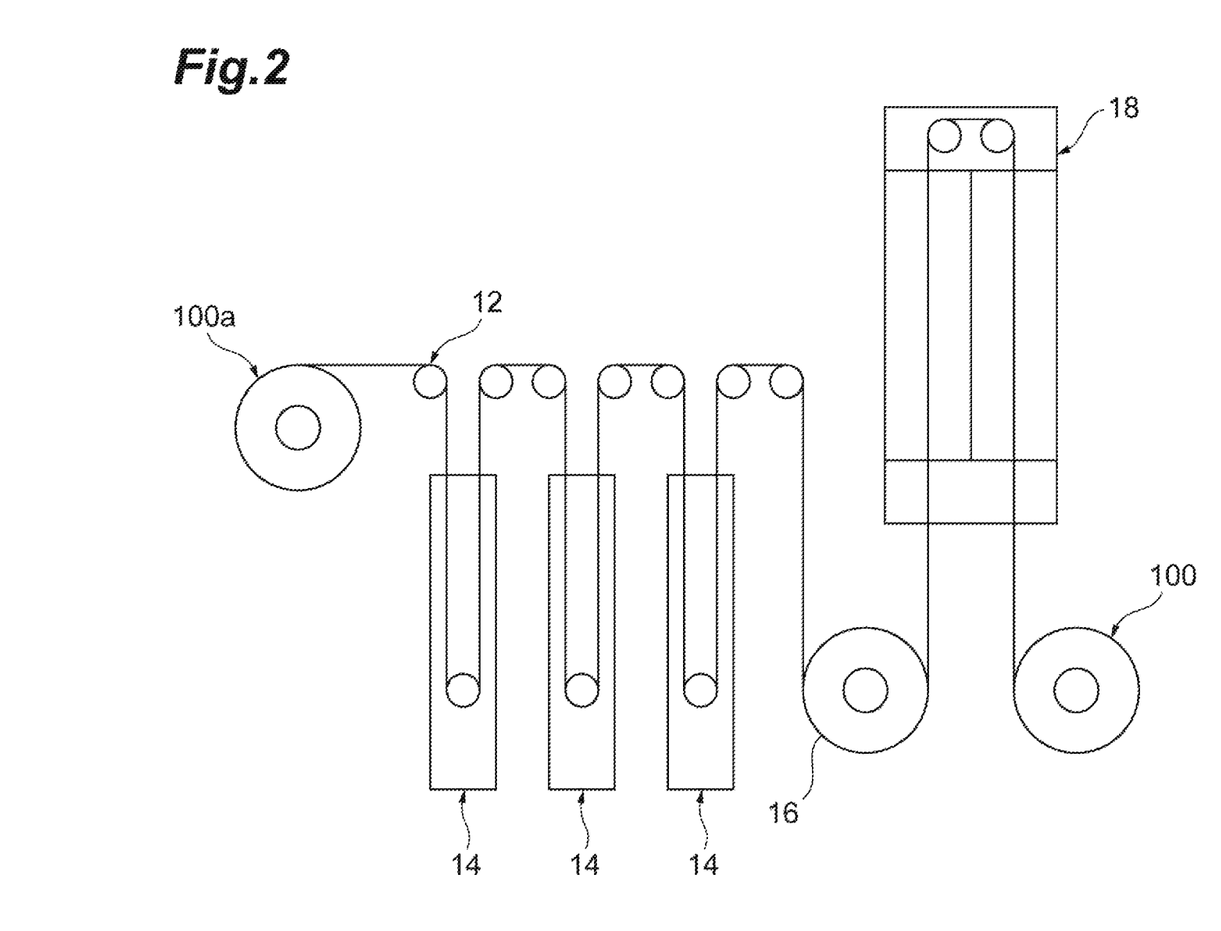
FIG. 2 is a step diagram illustrating one embodiment of a step of producing an aerogel laminate.

FIG. 2 is a step diagram illustrating one embodiment of the step of producing the aerogel laminate according to the Embodiment. As illustrated in FIG. 2, a roll-shaped wet gel laminate 100a produced in the step of preparing the wet gel is fed from the roll, is travelled through rotary rolls 12, and is washed by the roll-to-roll scheme while being passed through washing tanks 14. The number of washing tanks 14 is not limited, and part of the washing tanks may be used as a solvent exchange tank. The washed wet gel laminate is travelled through a rotary roll 16, is dried while passing through a drying furnace 18, and is wound around a roll core to obtain an aerogel laminate roll 100.

Figure 3:
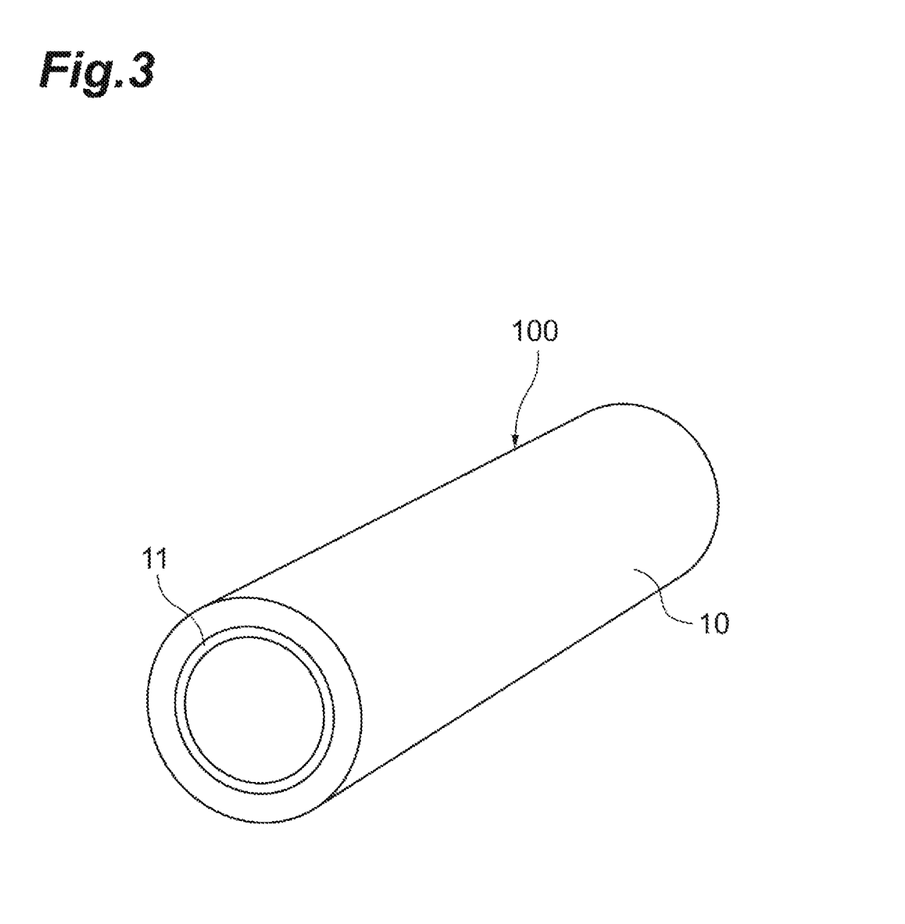
FIG. 3 is a perspective view of an aerogel laminate roll according to the Embodiment.

FIG. 3 is a perspective view schematically illustrating one suitable embodiment of the aerogel laminate roll. As illustrated in FIG. 3, the aerogel laminate roll 100 includes a cylindrical roll core 11, and an aerogel laminate 10 wound around the roll core 11 in the form of a roll. Namely, the aerogel laminate roll 100 according to the Embodiment is prepared by winding the aerogel laminate 10 around a roll core 11, the aerogel laminate including the support 2, and the aerogel layer 1 disposed on the support 2 and having a thickness of 200 μm or less.

Examples of the material for the cylindrical roll core include, but should not be limited to, paper tubes, wood tubes, plastic tubes, and metal tubes. In the case where the material for the roll core is plastic, example of the plastic include polyethylene resins, polypropylene resins, polystyrene resins, poly(vinyl chloride) resins, and ABS resins (acrylonitrile-butadiene-styrene copolymers).

The aerogel laminate roll according to the Embodiment enables formation of the aerogel into a thin film, which was difficult with respect to handling properties in the related art, and therefore can be handled in the form of a roll. The aerogel laminate according to the Embodiment can be used as a thermal insulation material having high thermal insulation properties and high flexibility, and a reduction in thickness of the thermal insulation material can be attained.

Because of such advantages, the aerogel laminate according to the Embodiment can be used in applications as a thermal insulation material in the cryogenic field (superconductivity, cryogenic container, and the like), in the universe field, the building field, the automobile field, household electrical appliances, the semiconductor field, and industrial facilities, etc. Moreover, the aerogel laminate according to the Embodiment can be used, besides applications as a thermal insulation material, as a water-repellant sheet, a sound absorbing sheet, a deadening sheet, and a catalyst carrying sheet.

EXAMPLES

Next, the present invention will be described in more detail by way of Examples below, but these Examples will not be limiting the present invention.

Example 1

[Sol Coating Solution 1]

2000.0 parts by mass of water, 1.00 part by mass of acetic acid as an acid catalyst, 200.0 parts by mass of cetyltrimethylammonium bromide bromide (made by Wako Pure Chemical Industries, Ltd., hereinafter, abbreviated to "CTAB") as a cationic surfactant, and 1200.0 parts by mass of urea as a thermally hydrolyzable compound were mixed, and 600.0 parts by mass of methyltrimethoxysilane (made by Shin-Etsu Chemical Co., Ltd., product name: KBM-13, hereinafter, abbreviated to "MTMS") and 400.0 parts by mass of dimethyldimethoxysilane (made by Shin-Etsu Chemical Co., Ltd., product name: KBM-22, hereinafter, abbreviated to "DMDMS") as silicon compounds were added to this to be reacted at 25° C. for 2 hours. Subsequently, a sol gel reaction was performed at 60° C. for 5 hours to obtain Sol coating solution 1.

[Aerogel Laminate Roll 1]

Using a comma coater, Sol coating solution 1 described above was applied to a double-sided aluminum deposited PET film (made by Hitachi AIC Inc., product name: VM-PET) as a support measuring 30 m (length)×600 mm (width)×12 μm (thickness) such that the thickness after gelation was 40 μm, was dried at 60° C. for 5 minutes, and was wound around the roll core to obtain a roll-shaped wet gel laminate. Subsequently, the wet gel laminate obtained was aged in a dryer at 60° C. for 8 hours.

Next, the aged roll-shaped wet gel laminate was fed from the roll, and was washed by the roll-to-roll scheme while passing through a first tank containing 600 L of water, a second tank containing 600 L of methanol, and a third tank containing 600 L of methanol in sequence such that the roll surface per meter was immersed for 6 seconds. Subsequently, the washed wet gel laminate was dried by the roll-to-roll scheme in a drying furnace at 120° C. for 10 minutes, and was wound around the roll core to obtain Aerogel laminate roll 1 including an aerogel laminate having structures represented by the above formulae (6) and (7).

Example 2

[Sol Coating Solution 2]

2000.0 parts by mass of water, 1.00 part by mass of acetic acid as an acid catalyst, 200.0 parts by mass of CTAB as a cationic surfactant, and 1200.0 parts by mass of urea as a thermally hydrolyzable compound were mixed, and 800.0 parts by mass of MTMS as a silicon compound and 200.0 parts by mass of a modified polysiloxane compound having two alkoxy functional groups at both ends having a structure represented by the above Formula (5) (hereinafter, referred to as "Polysiloxane compound A") as a polysiloxane compound were added to this to be reacted at 25° C. for 2 hours. Subsequently, a sol gel reaction was performed at 60° C. for 5 hours to obtain Sol coating solution 2.

"Polysiloxane compound A" described above was synthesized as follows. First, 100.0 parts by mass of dimethylpolysiloxane having silanol groups at both ends (made by Momentive Performance Materials Inc., product name: XC96-723), 181.3 parts by mass of methyltrimethoxysilane, and 0.50 parts by mass of t-butylamine were mixed in a 1-liter 3-necked flask including a stirrer, a thermometer, and a Dimroth condenser to be reacted at 30° C. for 5 hours. Subsequently, the reaction solution was heated under a reduced pressure of 1.3 kPa at 140° C. for 2 hours to remove volatile components, yielding a modified polysiloxane compound having two alkoxy functional groups at both ends (Polysiloxane compound A).

[Aerogel Laminate Roll 2]

Aerogel laminate roll 2 including an aerogel laminate having structures represented by the above formulae (2), (3), (6) and (7) was obtained using Sol coating solution 2 described above in the same manner as in Example 1.

Example 3

[Sol Coating Solution 3]

2000.0 parts by mass of water, 1.00 parts by mass of acetic acid as an acid catalyst, 200.0 parts by mass of CTAB as a cationic surfactant, and 1200.0 parts by mass of urea as a thermally hydrolyzable compound were mixed, and 600.0 parts by mass of MTMS as a silicon compound and 400.0 parts by mass of a modified polysiloxane compound having three alkoxy functional groups at both ends having a structure represented by the above Formula (5) (hereinafter, referred to as "Polysiloxane compound B") as a polysiloxane compound were added to this to be reacted at 25° C. for 2 hours. Subsequently, a sol gel reaction was performed at 60° C. for 2 hours to obtain Sol coating solution 6.

"Polysiloxane compound B" described above was synthesized as follows. First, 100.0 parts by mass of XC96-723, 202.6 parts by mass of tetramethoxysilane, and 0.50 parts by mass of t-butylamine were mixed in a 1-liter 3-necked flask including a stirrer, a thermometer, and a Dimroth condenser to be reacted at 30° C. for 5 hours. Subsequently, this reaction solution was heated under a reduced pressure of 1.3 kPa at 140° C. for 2 hours to remove volatile components, yielding a modified polysiloxane compound having three alkoxy functional groups at both ends (Polysiloxane compound B).

[Aerogel Laminate Roll 3]

Aerogel laminate roll 3 including an aerogel laminate having structures represented by the above formulae (2) and (6) was obtained using Sol coating solution 3 described above in the same manner as in Example 1.

Example 4

[Sol Coating Solution 4]

1000.0 parts by mass of PL-2L (made by FUSO CHEMICAL CO., LTD., product name, average primary particle diameter: 20 nm, solid content: 20% by mass) as a silica particle-containing raw material, 1000.0 parts by mass of water, 1.00 parts by mass of acetic acid as an acid catalyst, 200.0 parts by mass of CTAB as a cationic surfactant, and 1200.0 parts by mass of urea as a thermally hydrolyzable compound were mixed, 600.0 parts by mass of MTMS and 200.0 parts by mass of DMDMS as silicon compounds, and 200.0 parts by mass of X-22-160AS (made by Shin-Etsu Chemical Co., Ltd., product name) as a polysiloxane compound were added to this to be reacted at 25° C. for 2 hours. Subsequently, a sol gel reaction was performed at 60° C. for 1.0 hour to obtain Sol coating solution 4.

[Aerogel Laminate Roll 4]

Aerogel laminate roll 4 including an aerogel laminate having structures represented by the above formulae (1), (6) and (7) was obtained using Sol coating solution 4 described above in the same manner as in Example 1.

Example 5

[Sol Coating Solution 5]

1000.0 parts by mass of PL-2L as a silica particle-containing raw material, 1000.0 parts by mass of water, 1.00 parts by mass of acetic acid as an acid catalyst, 200.0 parts by mass of CTAB as a cationic surfactant, and 1200.0 parts by mass of urea as a thermally hydrolyzable compound were mixed, and 600.0 parts by mass of MTMS and 200.0 parts by mass of DMDMS as silicon compounds, and 20.0 parts by mass of Polysiloxane compound A as a polysiloxane compound were added to this to be reacted at 25° C. for 2 hours. Subsequently, a sol gel reaction was performed at 60° C. for 1.0 hour to obtain Sol coating solution 9.

[Aerogel Laminate Roll 5]

Aerogel laminate roll 5 including an aerogel laminate having structures represented by the above formulae (2), (3), (6) and (7) was obtained using Sol coating solution 5 described above in the same manner as in Example 1.

Example 6

[Sol Coating Solution 6]

1000.0 parts by mass of PL-2L as a silica particle-containing raw material, 1000.0 parts by mass of water, 1.00 parts by mass of acetic acid as an acid catalyst, 200.0 parts by mass of CTAB as a cationic surfactant, and 1200.0 parts by mass of urea as a thermally hydrolyzable compound were mixed, and 600.0 parts by mass of MTMS and 200.0 parts by mass of DMDMS as silicon compounds, and 200.0 parts by mass of Polysiloxane compound B as a polysiloxane compound were added to this to be reacted at 25° C. for 2 hours. Subsequently, a sol gel reaction was performed at 60° C. for 1.0 hour to obtain Sol coating solution 10.

[Aerogel Laminate Roll 6]

Aerogel laminate roll 6 including an aerogel laminate having structures represented by the above formulae (2), (6)

and (7) was obtained using Sol coating solution 6 described above in the same manner as in Example 1.

Example 7

[Aerogel Laminate Roll 7]

Aerogel laminate roll 7 including an aerogel laminate having structures represented by the above formulae (2), (3), (6) and (7) was obtained in the same manner as in Example 5 except that the thickness after gelation was changed to 20 μm.

Example 8

[Aerogel Laminate Roll 8]

Aerogel laminate roll 8 including an aerogel laminate having structures represented by the above formulae (2), (3), (6) and (7) was obtained in the same manner as in Example 5 except that the thickness after gelation was changed 100 μm.

Example 9

[Aerogel Laminate Roll 9]

Aerogel laminate roll 9 including an aerogel laminate having structures represented by the above formulae (2), (3), (6) and (7) was obtained in the same manner as in Example 5 except that the thickness after gelation was changed 150 μm.

Example 10

[Aerogel Laminate Roll 10]

Aerogel laminate roll 10 including an aerogel laminate having structures represented by the above formulae (2), (3), (6) and (7) was obtained in the same manner as in Example 5 except that the roll-shaped wet gel laminate was washed by the roll-to-roll scheme while being passed through a first tank containing 600 L of water, a second tank 1 containing 600 L of methanol, a third tank containing 600 L of methanol, and a fourth tank containing 600 L of methyl ethyl ketone in sequence.

Example 11

[Aerogel Laminate Roll 11]

Aerogel laminate roll 11 including an aerogel laminate having structures represented by the above formulae (2), (3), (6) and (7) was obtained in the same manner as in Example 5 except that a separator (made by OHKI CO., LTD., product name: OKILON-Sha2520) was laminated on the surface of the gel layer opposite to the support when the wet gel laminate was wound into a roll.

[Evaluation]

The aerogel laminate rolls obtained in Examples were measured and evaluated according to the following conditions.

(1) Preparation of Liquid Nitrogen Container for Evaluating Thermal Insulation Properties The aerogel laminate rolls were processed into Sheet A having a size of 606 mm (length)×343 mm (width), Sheet B having a size of 612 mm (length)×362 mm (width), Sheet C having a size of 618 mm (length)×380 mm (width), Sheet D having a diameter of 105 mm, Sheet E having a diameter of 112 mm, and Sheet F having a diameter of 118 mm, respectively.

Next, as sheets for an outer periphery of a liquid nitrogen container, Sheet A10 in which 10 layers of Sheet A were laminated, Sheet B10 in which 10 layers of Sheet B were laminated, and Sheet C10 in which 10 layers of Sheet C were laminated were produced, respectively, such that supports adjacent through an aerogel layer were not in direct contact with each other. In the same manner as above, as upper and lower sheets for a liquid nitrogen container, Sheet D10 in which 10 layers of Sheet D were laminated, Sheet E10 in which 10 layers of Sheet E were laminated, and Sheet F10 in which 10 layers of Sheet F were laminated were produced, respectively.

Description

A liquid nitrogen container having a height of 600 mm and a diameter of 100 mm was prepared; Sheet A10 was disposed on the side surfaces, and Sheet D10 was disposed on each of the upper and lower sides of the liquid nitrogen container; the sheets were wrapped around the liquid nitrogen container. Next, Sheet B10 was disposed on Sheet A10, Sheet E10 was disposed on Sheet D10, Sheet C10 was disposed on Sheet B10, and Sheet F10 was disposed on Sheet E10 to obtain a liquid nitrogen container for evaluating thermal insulation properties in which 30 layers of the aerogel laminate were laminated. The connection portions between the sheets on the side surfaces and the upper and lower sheets were bonded with an aluminum tape.

Figure 4:
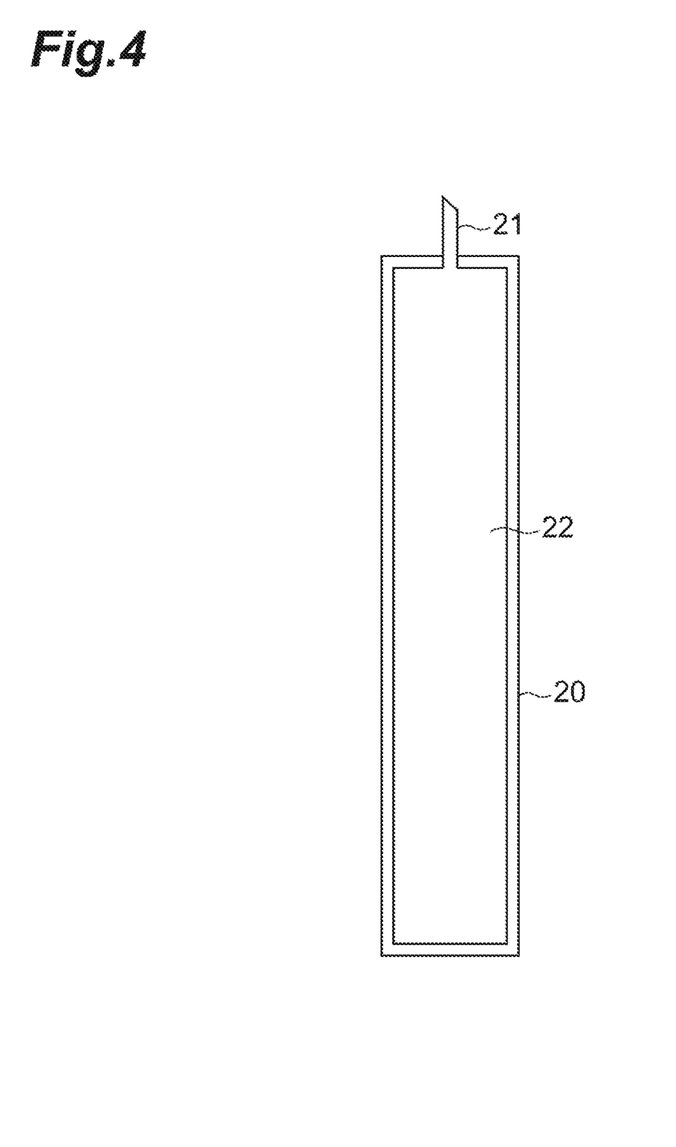
FIG. 4 is a schematic cross-sectional view of a liquid nitrogen container for evaluating thermal insulation properties.

FIG. 4 is a cross-sectional view schematically illustrating the structure of the liquid nitrogen container for evaluating thermal insulation properties in which a thermal insulation material 20 is wrapped around a liquid nitrogen container 22. The thermal insulation material 20 composed of 30 layers of the aerogel laminate is laminated on the liquid nitrogen container 22 having an inlet 21 so as to cover the outer periphery.

(2) Measurement of Thickness of Thermal Insulation Material

The total thickness D30 (mm) of the thermal insulation material 20 disposed on the outer periphery of the liquid nitrogen container 22 was calculated from the following expression:

$$D_{30}=D_c/2-50.0$$

where $D_c$ (mm) represents the diameter of the liquid nitrogen container after 30 layers of the aerogel laminate are wrapped around the container.

(3) Thermal Insulation Performance (Heat Flux)

Figure 5:
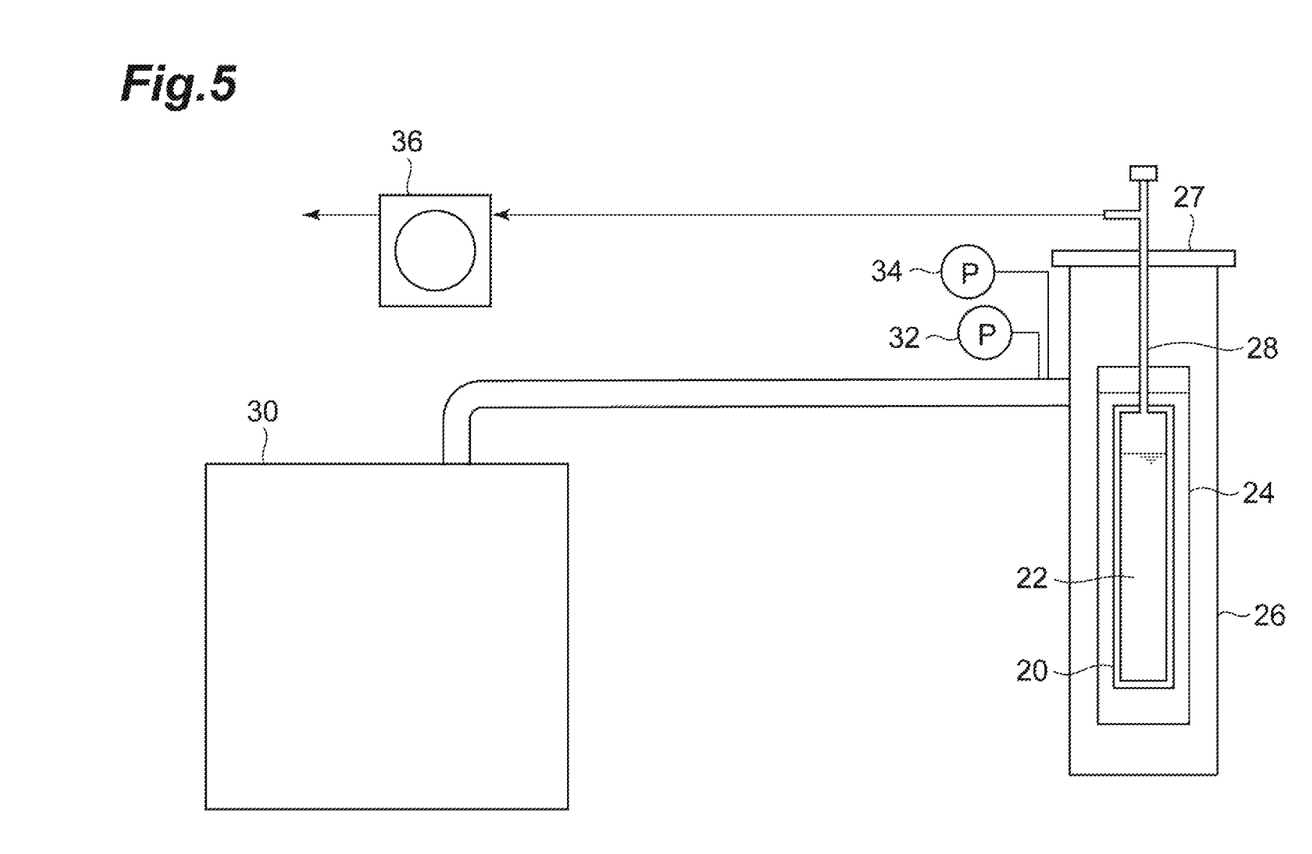
FIG. 5 is a schematic view of a thermal insulation performance tester.

The thermal insulation performance was measured using the liquid nitrogen container for evaluating thermal insulation properties. A schematic view of the thermal insulation performance tester is illustrated in FIG. 5. First, the liquid nitrogen container 22 having the thermal insulation material 20 wrapped therearound was placed in a thermostat 24 set at 283 K, and the thermostat was placed in a vacuum container 26. Next, the vacuum container 26 was evacuated with a turbomolecular pump 30, and the vacuum pressure inside the vacuum container 26 was measured with a Pirani vacuum gauge 32 and an ion vacuum gauge 34. The turbomolecular pump 30 was operated, and it was checked that the Pirani vacuum gauge 32 indicated a vacuum pressure of $4\times10^{-1}$ Pa or less; then, the vacuum pressure was measured with the ion vacuum gauge 34, and evacuation was performed for 7 days until the pressure of the vacuum container 26 reached $1\times10^{-2}$ Pa or less. Subsequently, after liquid nitrogen was poured into the liquid nitrogen container 22 placed in the vacuum container 26, the heat flux q passing through the thermal insulation material 20 when it was verified that the temperature of a neck pipe 28 and the flow rate of evaporated nitrogen gas had approximately constant values and were in a stationary state was calculated.

The evaporating gas mass flow rate m (kg/s) of liquid nitrogen was determined from the following expression (I).

[Expression 1]
$$m = \rho_{g,T} \times V_{g,T} \quad \text{(I)}$$

In the expression (I), $\rho_{g,T}$ represents the gas density (kg/m³) at room temperature; $V_{g,T}$ represents the gas flow rate (m³/s) at room temperature measured from the output of a wet flow meter 36 and the temperature inside the wet flow meter 36.

Next, the sum of the radiant heat quantity $Q_r$ (W) coming through the thermal insulation material 20 and the conductive heat $Q_c$ (W) from the neck pipe 28 connecting a flange 27 to the liquid nitrogen container 22 was determined from the following expression (II).

[Expression 2]
$$Q_r + Q_c = \frac{m \times L}{\left(1 - \frac{\rho_{g,s}}{\rho_{l,s}}\right)} \quad \text{(II)}$$

In the expression (II), L represents the evaporative latent heat (J/kg) of liquid nitrogen, $\rho_{g,s}$ represents the nitrogen gas density (kg/m³) at a saturated temperature under atmospheric pressure, and $\rho_{l,s}$ represents the liquid nitrogen density (kg/m³).

Moreover, $Q_c$ was determined from the following expression (III).

[Expression 3]
$$Q_c = \left(\frac{A_s}{L_c} \int_{T_l}^{T_h} \lambda_{sus} \, dT\right) \times \phi \quad \text{(III)}$$

In the expression (III), the expression in the brackets 0 represents the conductive heat of the neck pipe 28, $A_s$ (m²) represents the cross-sectional area of the neck pipe 28, $L_c$ (m) represents the length of the neck pipe 28, $T_h$ (K) represents a constant temperature, $T_l$ (K) represents a low temperature, and $\lambda_{sus}$ (W/(m·K)) represents the thermal conductivity of stainless steel. The conductive heat of the neck pipe 28 is related with the coefficient of the efficiency $\phi$ because heat is lost from the surface of the neck pipe 28 due to heat conduction of evaporating gas.

The efficiency $\phi$ was determined from the following expression (IV).

[Expression 4]
$$\phi = \frac{\ln(1 + C_p(T_h - T_1)/L)}{C_p(T_h - T_1)/L} \quad \text{(IV)}$$

In the expression (IV), $C_p$ (J/(kg·K)) represents the specific heat. In this evaluation, the value of $A_s$ above is $0.243 \times 10^{-4}$ (m²), and the value of L above is 199000 (J/kg).

The heat flux q (W/m²) passing through the aerogel laminate was determined from the following expression (V). The measurement of the heat flux was performed three times, and the average value was defined as the heat flux in this evaluation.

$$q = Q_r / A_r \quad \text{[Expression 5]}$$

In the expression (V), $A_r$ (m²) represents the surface area of the liquid nitrogen container, and the value is 0.2041 (m²).

The evaluations of the layer configurations and thermal insulation properties of the aerogel laminates obtained in the Examples are shown in Table 1.

TABLE 1

| | Aerogel laminate | | Thermal insulation material | |
|---|---|---|---|---|
| | Thermal insulation layer (Thickness: μm) | Support (Thickness: μm) | Thickness: mm | Heat flux: W/m² |
| Example 1 | Aerogel layer (40) | Double-sided aluminum deposited PET film (12) | 6.1 | 0.84 |
| Example 2 | Aerogel layer (40) | Double-sided aluminum deposited PET film (12) | 6.1 | 0.72 |
| Example 3 | Aerogel layer (40) | Double-sided aluminum deposited PET film (12) | 6.0 | 0.70 |
| Example 4 | Aerogel layer (40) | Double-sided aluminum deposited PET film (12) | 5.8 | 0.81 |
| Example 5 | Aerogel layer (40) | Double-sided aluminum deposited PET film (12) | 5.9 | 0.75 |
| Example 6 | Aerogel layer (40) | Double-sided aluminum deposited PET film (12) | 6.0 | 0.73 |
| Example 7 | Aerogel layer (20) | Double-sided aluminum deposited PET film (12) | 4.3 | 0.88 |
| Example 8 | Aerogel layer (100) | Double-sided aluminum deposited PET film (12) | 11.4 | 0.68 |
| Example 9 | Aerogel layer (150) | Double-sided aluminum deposited PET film (12) | 15.9 | 0.65 |
| Example 10 | Aerogel layer (40) | Double-sided aluminum deposited PET film (12) | 5.9 | 0.76 |
| Example 11 | Aerogel layer (40) | Double-sided aluminum deposited PET film (12) | 5.9 | 0.75 |

From Table 1, it was verified that the heat flux is small and the thermal insulation performance is superior in the case where the aerogel laminates obtained from the aerogel laminate rolls produced in Examples are used. Moreover, it can be verified that because the aerogel layer and the support are integrated in the aerogel laminates produced in Examples, deviation in the roll is barely generated and the thickness of the thermal insulation material can be reduced.

REFERENCE SIGNS LIST

1 . . . aerogel layer, 2 . . . support, 10 . . . aerogel laminate, 11 . . . roll core, 12 . . . rotary roll, 14 . . . washing tank, 16 . . . rotary roll, 18 . . . drying furnace, 20 . . . thermal insulation material, 21 . . . inlet, 22 . . . liquid nitrogen container, 24 . . . thermostat, 26 . . . vacuum container, 27 . . . flange, 28 . . . neck pipe, 30 . . . turbomolecular pump, 32 . . . Pirani vacuum gauge, 34 . . . ion vacuum gauge, 36 . . . wet flow meter, 100 . . . aerogel laminate roll, 100a . . . wet gel laminate.

The invention claimed is:

1. A production method for an aerogel laminate comprising a support, and an aerogel layer disposed on the support, the aerogel layer being a layer containing an aerogel having a structure derived from polysiloxane and having a thickness of 10 µm to 200 µm, the method comprising:
   a step of washing a wet gel laminate comprising the support and a wet gel layer disposed on the support by a roll-to-roll scheme.

2. The production method for an aerogel laminate according to claim 1, wherein a thickness of the wet gel layer is 400 µm or less.

3. The production method for an aerogel laminate according to claim 1, wherein the wet gel contains a gel formed from a sol containing at least one selected from the group consisting of polysiloxane compounds having a reactive group in the molecule and hydrolysis products of the polysiloxane compounds.

4. The production method for an aerogel laminate according to claim 1, wherein the wet gel layer contains a gel formed from a sol containing silica particles.

5. The production method for an aerogel laminate according to claim 1, wherein the wet gel laminate is washed using a hydrophilic organic solvent.

* * * * *